United States Patent
Johnson et al.

(10) Patent No.: US 8,145,424 B2
(45) Date of Patent: Mar. 27, 2012

(54) GEOBOUNDARIES USING RECTANGULAR FENCING AND COUPLING OF GPS/LBS SYSTEMS

(75) Inventors: Randy S. Johnson, O'Fallon, MO (US); Tedrick N. Northway, Wood River, IL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 12/187,044

(22) Filed: Aug. 6, 2008

(65) Prior Publication Data

US 2010/0036608 A1 Feb. 11, 2010

(51) Int. Cl.
*G01C 21/30* (2006.01)
(52) U.S. Cl. .................... 701/409; 455/457; 701/519
(58) Field of Classification Search .................. 701/207, 701/200, 202, 208, 213; 707/724, 919, 920; 455/456.1, 457
See application file for complete search history.

(56) References Cited

U.S. PATENT DOCUMENTS

| | | | | |
|---|---|---|---|---|
| 5,649,079 | A * | 7/1997 | Holmes | 345/423 |
| 6,320,517 | B1 * | 11/2001 | Yano et al. | 340/995.15 |
| 6,665,613 | B2 * | 12/2003 | Duvall | 701/213 |
| 6,721,652 | B1 | 4/2004 | Sanqunetti | |
| 2001/0028350 | A1 * | 10/2001 | Matsuoka et al. | 345/427 |
| 2002/0188581 | A1 | 12/2002 | Fortin et al. | |
| 2004/0111195 | A1 * | 6/2004 | Vries et al. | 701/21 |
| 2005/0159883 | A1 * | 7/2005 | Humphries et al. | 701/207 |
| 2006/0200305 | A1 * | 9/2006 | Sheha et al. | 701/200 |
| 2006/0270421 | A1 * | 11/2006 | Phillips et al. | 455/457 |
| 2007/0176771 | A1 | 8/2007 | Doyle | |
| 2008/0021637 | A1 | 1/2008 | Staton et al. | |
| 2008/0162034 | A1 * | 7/2008 | Breen | 701/202 |
| 2010/0042940 | A1 * | 2/2010 | Monday et al. | 715/764 |

OTHER PUBLICATIONS

European Telecommunications Standards Institute, Open Service Access(OSA);Parlay X Web Services; Part 9: Terminal Location (Parlay X 3), Jun. 2007, vol. 0.0.4, http://www.etsi.org.

* cited by examiner

*Primary Examiner* — Thomas Black
*Assistant Examiner* — Sze-Hon Kong
(74) *Attorney, Agent, or Firm* — Patrick J. Daugherty; Driggs, Hogg, Daugherty & Del Zoppo Co., LPA

(57) ABSTRACT

A method for establishing a geographic boundary and monitoring an object within the boundary is provided. At least one first entity provides a second entity a request to form the geographic boundary and monitor the object within the boundary. The request may include parameters including at least a first set of coordinates of a geographic location associated with the geographic boundary to be formed. The method includes determining if the parameters provided include additional sets of coordinates for additional geographic locations associated with the geographic boundary to be formed. A footprint of the geographic boundary is selected dependent on whether the parameters provided include additional sets of coordinates. A rectangular footprint may be selected if the parameters include additional sets of coordinates and the coordinates form an isosceles triangle. The method includes forming the geographic boundary having the selected footprint. The object may be monitored within the geographic boundary.

16 Claims, 7 Drawing Sheets

GEOBOUNDARIES USING RECTANGULAR FENCING AND COUPLING OF GPS/LBS SYSTEMS

FIELD OF THE INVENTION

The present invention generally describes a method, process, system and device for creating geo-boundaries using rectangular fencing and coupling of GPS/LBS systems.

BACKGROUND OF THE INVENTION

It is known to create a geographical boundary ("geo-boundary") using fencing known as a Geo-fence. A Geo-fence is a defined virtual spatial boundary typically created for tracking an object within its boundaries. Typically, the object is tracked using a mobile location enabled device such as a GPS enabled mobile device or other wireless telecommunication device such as a cellular telephone.

One prior art method of defining a geo-boundary involves selecting a geographic point, such as longitude and latitude, and then defining a radius for the point in order to define a circular boundary around the point. However, the prior art circular geo-boundary does not represent a common representation of a geo-boundary such as the rectangular footprint of a building, airport or other man made structure. Thus, it is not possible to track all objects in a structure having a rectangular footprint with the prior art circular geo-boundary.

Thus, there is a need for improved methods and systems that address the above problems, as well as others.

SUMMARY OF THE INVENTION

Methods, systems and devices are provided for establishing a geographic boundary and monitoring an object within the boundary. The method comprises at least one first entity providing a second entity a request to form the geographic boundary and monitor the object within the boundary. The request includes parameters including at least a first set of coordinates of a geographic location associated with the geographic boundary to be formed. The method includes determining whether the parameters provided include additional sets of coordinates for additional geographic locations associated with the geographic boundary to be formed. A footprint of the geographic boundary is selected dependent on whether the parameters provided include additional sets of coordinates. The method includes forming the geographic boundary having the selected footprint. The geographic boundary may be monitored to determine whether the object has entered the geographic boundary. The method may include sending a notification to the first entity if the object has entered the target area. The method may include the first entity or the second entity signaling the object when the object has entered the target area.

In another embodiment of the invention, there is provided a method of deploying an application enabling establishing a geographic boundary and monitoring an object within the boundary. The method includes providing a computational device infrastructure configured to: a) receive a request to form the geographic boundary and monitor the object within the boundary, the request including parameters including at least a first set of coordinates of a geographic location associated with the geographic boundary to be formed; b) determine whether the parameters provided include additional sets of coordinates for additional geographic locations associated with the geographic boundary to be formed; c) select a footprint of the geographic boundary dependent on whether the parameters provided include additional sets of coordinates; d) form the geographic boundary having the selected footprint; and e) monitor the geographic boundary to determine whether the object has entered the geographic boundary. The method may include sending a notification to an entity if the object has entered the target area.

In another embodiment of the invention, there is provided a method of establishing a geographic boundary and monitoring an object within the boundary. The method comprises: a) producing computer executable program code; b) storing the code on a computer readable medium; and c) providing the program code to be deployed and executed on a computer system. The program code causes the computer system to: 1) receive a request from an entity to form the geographic boundary and monitor the object within the boundary, the request including parameters including at least a first set of coordinates of a geographic location associated with the geographic boundary to be formed; 2) determine whether the parameters provided include additional sets of coordinates for additional geographic locations associated with the geographic boundary to be formed; 3) select a footprint of the geographic boundary dependent on whether the parameters provided include additional sets of coordinates; 4) form the geographic boundary having the selected footprint; and 5) monitor the geographic boundary to determine whether the object has entered the geographic boundary. The method may include the program code comprising instructions to send a notification to the entity if the object has entered the target area.

In an embodiment of the invention, there is provided a programmable device, comprising: a) a processing means; b) a memory in communication with the processing means comprising an instruction parser logic component; and c) a network interface in communication with the processing means and the memory. The processing means is configured to: 1) parse a request received from an entity over the network interface to form the geographic boundary and monitor the object within the boundary, the request including parameters including at least a first set of coordinates of a geographic location associated with the geographic boundary to be formed; 2) determine whether the parameters provided include additional sets of coordinates for additional geographic locations associated with the geographic boundary to be formed; 3) select a footprint of the geographic boundary dependent on whether the parameters provided include additional sets of coordinates; 4) form the geographic boundary having the selected footprint; and 5) monitor the geographic boundary to determine whether the object has entered the geographic boundary. The device may include processing means configured to send a notification to the entity if the object has entered the target area.

BRIEF DESCRIPTION OF THE DRAWINGS

These and other features of the methods, systems and devices for defining a geo-boundary in the shape of a rectangle will be more readily understood from the following detailed description of the various aspects of the embodiments taken in conjunction with the accompanying drawings in which.

Figure 1:
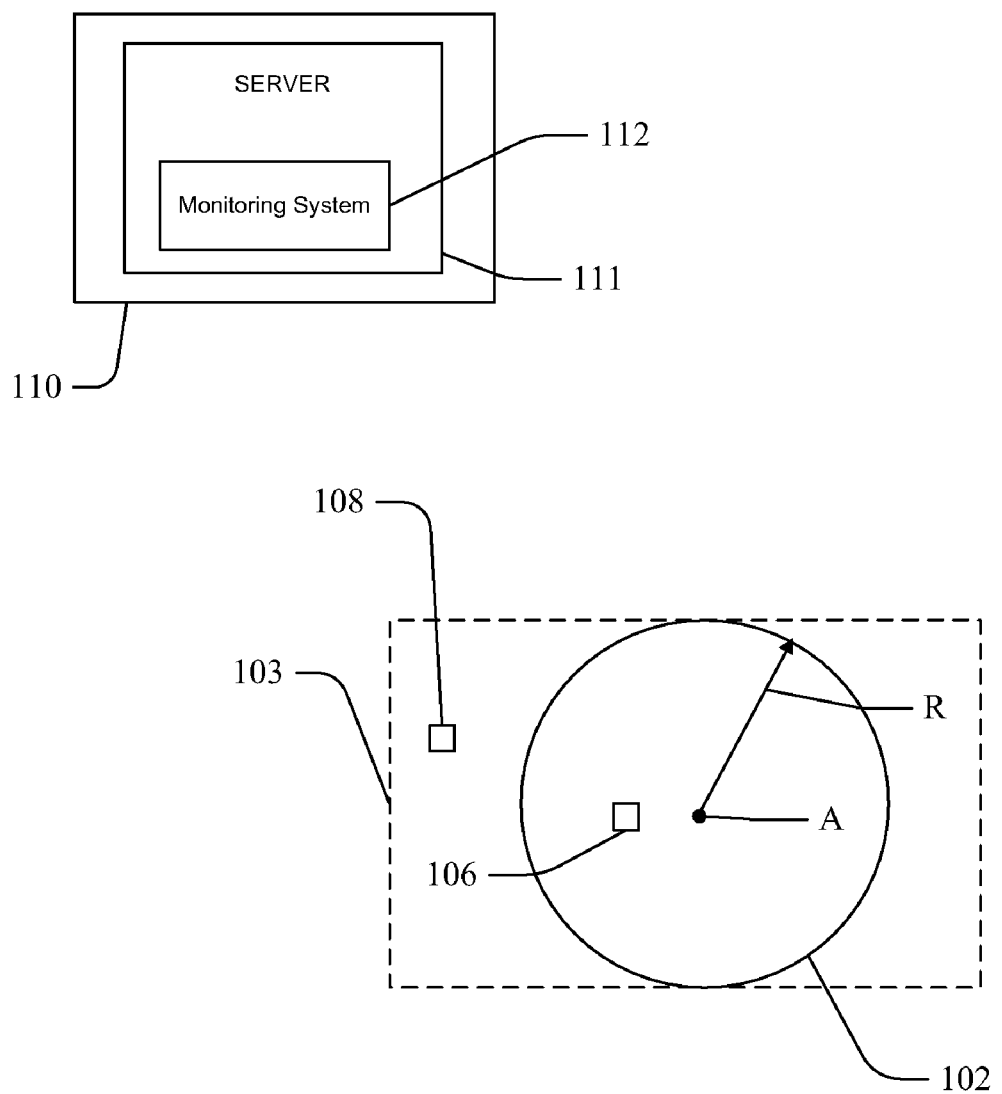
FIG. 1 is a prior art system for forming a circular geo-boundary at a site.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description; and
II. Computerized Implementation.
I. General Description The present application discloses systems, methods, devices and program products for creating two and three-dimensional geo-boundaries using rectangular fencing for tracking an object such within the geo-boundary. A geo-boundary is a defined geographical boundary where it is desired to track an object such as a vehicle, constructions equipment, tools, or other object known to one of ordinary skill in the art.

Referring now to FIG. 1, shown is a prior art method and system of using a circular geo-boundary 102 for tracking an object 106 within a pre-determined area. The circular geo-boundary 102 is defined by a point A, typically representing the center of a desired geographic location, and a pre-defined radius R which establishes the radius of a circle a distance from point A. The radius R is pre-determined to define a desired geographic area within geo-boundary 102 where it is desired to monitor the location of the object 106. The geographic location of Point A could be represented as coordinates such as longitude and latitude.

Once the circular geo-boundary 102 is established, the object 106 may be monitored to determine the presence and location of the object 106 within the geo-boundary 102. The circular geo-boundary 102 is typically established by an entity 110 hosting a server 111 which calculates the geo-boundary 102 using the coordinates of point A and the radius R. The server 111 of entity 110 may include a monitoring system 112 for monitoring the location of the object 106 within the geo-boundary 102 using methods known to one of ordinary skill in the art. The object 106 is equipped with or is a device capable of being remotely located. The device may be a GPS enabled device, cellular telephone, or other mobile device known to one of ordinary skill in the art that is capable of being located using known techniques. The object 106 may include a unique identifier which enables the monitoring system 112 to identify the object 106 to be located.

The location of object 106 as it moves within the geo-boundary 102 may be compared constantly or upon demand by the monitoring system 112 to the geo-boundary 102 to see if the object 106 is within the defined geo-boundary 102. If the monitoring system 112 detects that the location of the object 106 is inside or outside of the defined geo-boundary 102, the entity 110 may initiate a pre-determined response.

However, the prior art circular geo-boundary 102 does not represent common representations of geo-boundaries. Particularly, the footprint of most buildings, office spaces, airports and other man made structures are best represented by a rectangle. As a result, if the prior art circular geo-boundary 102 were to be used to track objects within a rectangular building or structure (represented in phantom and identified by reference numeral 103 in FIG. 1), an object 108 may fall outside of the circular geo-boundary 102 but still be within the perimeter of the structure 103. Thus, it is not possible to track all objects located in the structure 103 having a rectangular footprint with the prior art circular geo-boundary 102. Accordingly, it is desirable to define a geo-boundary having a rectangular shape that is more representative of common representations of the footprints of structures such as buildings and airports.

Figure 2A:
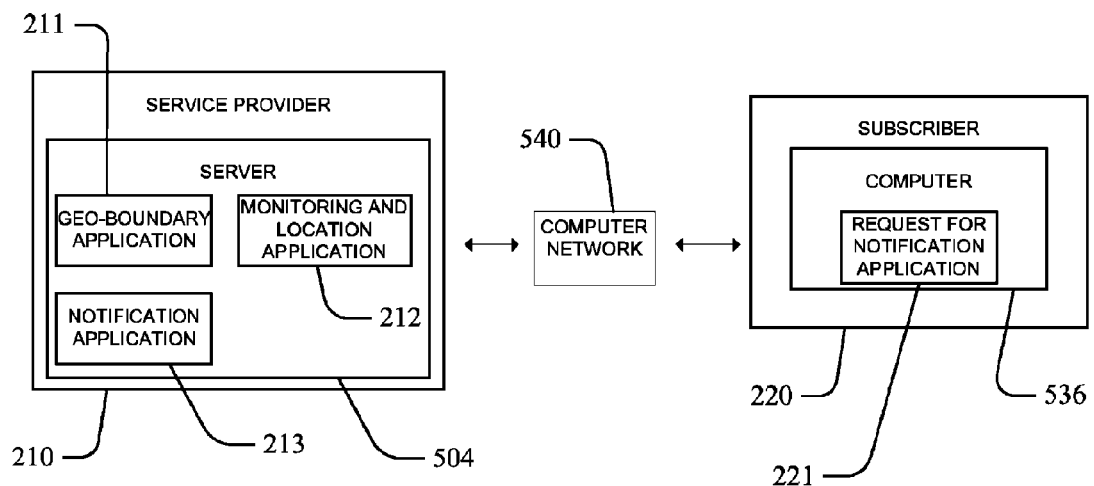
FIG. 2A is a block diagram illustration of a system using an embodiment of a method for creating a rectangular geo-boundary at a site.
Figure 2A:
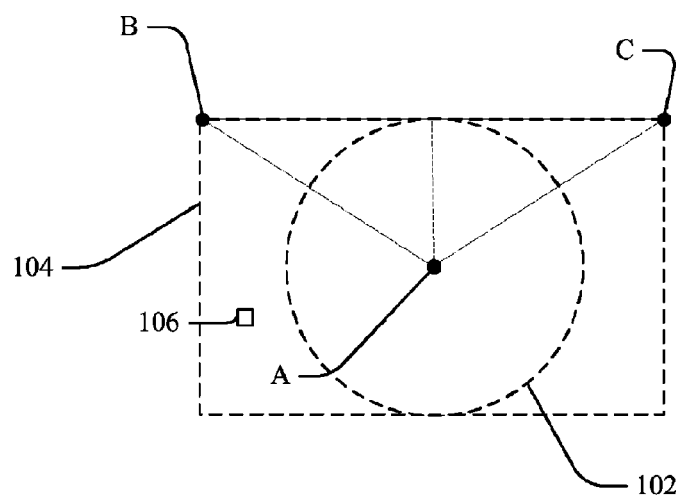

Referring now to FIG. 2A, an embodiment of the method, system or process for defining geo-boundaries using rectangular fencing is illustrated. In the embodiment shown, a subscriber 220 sends a Request for Notification to a service provider 210 for creating one or more geo-boundaries for monitoring when an object 206 enters a predetermined geo-boundary. Such object 206 may include a location based system (LBS), global positioning satellite (GPS) enabled device, or other device known to one of ordinary skill in the art capable of being located using known locating techniques. The service provider 210 hosts a server 504 (see also FIG. 5) which is operatively connected to a computer 536 (see also FIG. 5) of the subscriber 220 over a computer network 540 (see also FIG. 5). The service provider 210 may be a service which creates and maintains a database of geo-boundaries for one or more subscribers 220. The subscriber 210 may be any entity that desires to know when an object 206 enters and/or leaves the geo-boundary requested to be created by the service provider 210.

For example, the subscriber 220 may be a business that wishes to be notified when a particular customer enter a pre-defined area. The pre-defined area may be the building in which the business is located. This necessarily requires that the customer carry an object 206 that is capable of being located. Particularly, the object 206 may be a mobile device such as a GPS enabled device, cellular telephone, or other mobile device known to one of ordinary skill in the art. The mobile device may be equipped with a unique identifier which allows the service provider 210 to identify the identity of the mobile device. The unique identifier may be the telephone number of a cellular telephone, an IP address of a mobile computing device, or other unique identifier known to one of ordinary skill in the art.

The subscriber 220 may desire to send the customer a message, alert, or other signal when the customer enters the pre-defined area. The message, alert or other signal may be related to a special offering or incentive the subscriber 220 wishes the customer to be aware of. For example, the subscriber 220 may wish to send the message or alert to a customer's cellular telephone to make the customer aware of the special offering or incentive when the customer enters the building where the subscriber's 220 business is located. The message may be a Short Message Service (SMS) text message, voice message, or other message sent to a customer's cellular telephone. The subscriber 220 may provide the service provider 210 with the customers it wishes to send the special offering or incentive to, the unique identifier of the mobile device of the customer, the content of the special offering or incentive, and the times and conditions under which the special offering or incentive is to be delivered to the mobile device of the customer.

The subscriber 220 may desire to create a geo-boundary for monitoring one object 206 or multiple objects 206. Alternately, the subscriber 220 may desire to create multiple geo-boundaries for monitoring the object 206 or multiple objects 206. For example, the subscriber 220 may be a business having multiple locations that it wishes to be notified when designated customers enter a geo-boundary 202 designated for a particular location. The subscriber 220 may desire to send the special offering or incentive to the customer when the customer is at one or more of the locations.

The service provider 210 may create and monitor geo-boundaries for one or more subscribers 220. Each of the subscribers 220 may be operably connected to the service provider 210 over a computer network 540. The computer network 540 may be a global computer network such as the Internet or other computer network known to one of ordinary skill in the art. Thus, each of the subscribers 220 may be remotely located from the service provider 210. The Request for Notification when an object 202 enters a geo-boundary may be generated by a Request for Notification Application 221 located on the subscriber's 220 computer 536. The request may be sent from the subscriber 220 to the service provider 210 via the computer network 540. The request may include location information related to the geo-boundary to be established by the service provider 210, dimensions of the geo-boundaries, and other information related to the monitoring of an object within the geo-boundaries.

Upon receipt of a Request for Notification from a subscriber 220 to be notified of an object 106 entering a desired geographic area, the service provider 210 queries the request to determine whether the location information provided includes coordinates for a first geographic point A and a radius R, or whether the location information includes a second geographic point B and a third geographic point B related to the desired geo-boundary. The service provider 210 may have a Geo-boundary Application 211 provided on the server 504 for this purpose. If location information is provided for a single geographic point A and a radius R, then the boundary setup application 213 defines the geo-boundary to be a prior art circular geo-boundary 102. Alternately, the Geo-boundary Application 211 may create an exception. A Monitoring and Location Application 212 provided on the server 504 then monitors the geo-boundary 102 to determine if an object 106 defined by the subscriber 220 enters the geo-boundary 102. If the object 106 defined by the subscriber 220 enters the geo-boundary 102, a Notification Application 213 provided on the server 504 sends a notification to the subscriber 220. If the subscriber 220 receives such a notification, the subscriber 220 may initiate a desired response. For example, the subscriber 220 may instruct the service provider 210 to send a message to the object 106. As previously discussed, the object 106 may be a mobile device carried by a customer. The message may be a special offering or incentive that the subscriber 220 desires the customer to be aware of when the customer enters the geo-boundary 102.

Alternately, if the Geo-boundary Application 211 determines that the subscriber 220 provided location information comprising additional coordinates for additional geographic points such as points B and C, then the Geo-boundary Application 211 may determine whether the geo-boundary is to be defined as a rectangular. It should be understood that for efficiency purposes it is desirable to create the rectangular geo-boundary 104 (shown in phantom in FIG. 2A) with the least number of parameters possible to be provided to the service provider 210.

In order to determine whether the geo-boundary to be created is rectangular, the Geo-boundary Application 211 determines whether a triangular boundary formed by points A, B and C is an isosceles triangle. If the triangular boundary formed by points A, B and C is an isosceles triangle, then the coordinates provided by the subscriber 220 to the service provider 210 define a rectangular geo-boundary 104 to be created. If the triangular boundary formed by points A, B and C is determined not to be an isosceles triangle, then the coordinates provided by the subscriber 220 to the service provider 210 do not define a rectangular geo-boundary.

The Geo-boundary Application 211 determines whether the triangular boundary formed by points A, B and C is an isosceles triangle by determining whether two sides of the triangular boundary of equal length. Two sides of an isosceles triangle are of equal length by definition. For the purposes of discussion herein, point A may be represented by the coordinates $X_1, Y_1$, point B may be represented by the coordinates $X_2, Y_2$, and point C may be represented by the coordinates $X_3, Y_3$. In determining whether two sides of the triangular boundary formed by points A, B and C are of equal length, the Pythagorean theorem may be used to calculate the hypotenuse of a right triangle formed from three sides defined by a first side defined by line AB, a second side defined by the height of the isosceles triangle ABC (shown in dashed lines), and a third side that extends from point B to a point on line BC where a perpendicular line extending from point A intersects line BC. The length of the second side may be calculated by subtracting $Y_2-Y_1$. The length of the third side may be calculated by subtracting $X_2-X_1$.

The Pythagorean theorem is summarized as the square of the hypotenuse of a right triangle is equal to the sum of the squares on the other two sides. Expressed mathematically, the Pythagorean theorem is: $c=\sqrt{a^2+b^2}$ here a and b are the length of two of the sides of the triangle and C is the length of the hypotenuse.

Inserting the coordinates of points A and B into the foregoing equation yields the following equation:

$$ab=\sqrt{(X_2-X_1)^2+(Y_2-Y_1)^2}$$

where ab is the length of the line AB or the hypotenuse of the right triangle defined by points A and B and the height of triangle ABC.

The Pythagorean theorem is used again to calculate the hypotenuse of a another right triangle formed from three sides defined by a first side defined by line AC, a second side defined by the height of the isosceles triangle ABC (shown in dashed lines), and a third side that extends from point C to a point on line BC where a perpendicular line extending from point A intersects line BC. The length of the second side may be calculated by subtracting $Y_3-Y_1$. The length of third side may be calculated by subtracting $X_3-X_1$.

Inserting the coordinates of points A and C into the foregoing equation yields the following equation:

$$ac=\sqrt{(X_3-X_1)^2+(Y_3-Y_1)^2}$$

where ac is the length of line AC or the hypotenuse of the right triangle defined by points A and C and the height of triangle ABC. If the length ab of line AB is equal to the length ac of line AC, then triangle ABC must be an isosceles triangle.

Figure 2B:
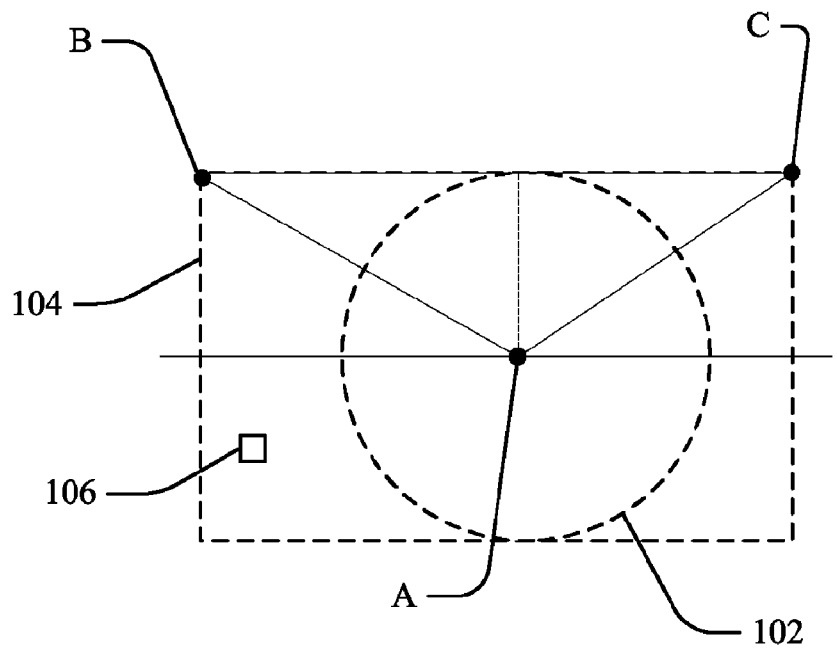
FIG. 2B is a block diagram illustration of the site of FIG. 2A wherein the method forms a triangle from three points A, B and C provided in a Request for Notification and determines whether the triangle is an isosceles triangle.
Figure 2C:
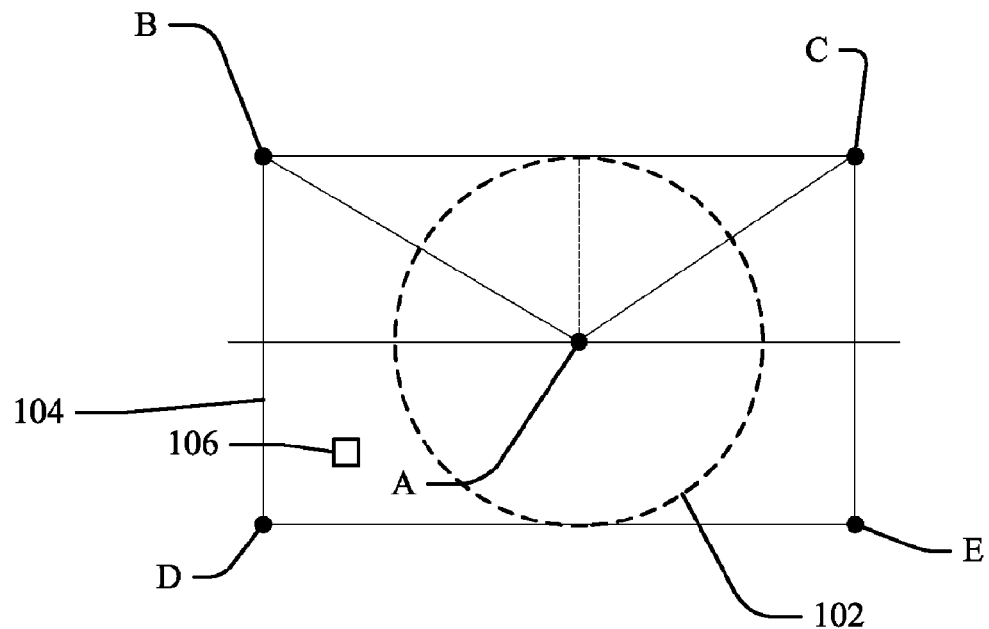
FIG. 2C is another block diagram illustration of the site of FIG. 2A wherein the method reflects points B and C over a line passing through point A to form a rectangular geo-boundary.

Referring now to FIG. 2B, if the triangular boundary formed by point A, B and C is verified as an isosceles triangle, the remainder of the rectangular geo-boundary 104 may be determined by mirroring the triangle across a line parallel to line BC and passing through point A. To accomplish this, the slope of line BC is determined using the slope equation $m=y_2-y_3/x_2-x_3$. Once the slope m is determined, a new line is formed with the line equation $y=mx+b$ using the coordinates $X_1$, $Y_1$ from point A to solve for b. The new line provides a new line points B and C may be reflected over. In FIG. 2C, the points on the new line corresponding to reflected points B and C are new points D and E. With the points D and E known, the computer can form the new rectangular geo-boundary 104.

Figure 2D:
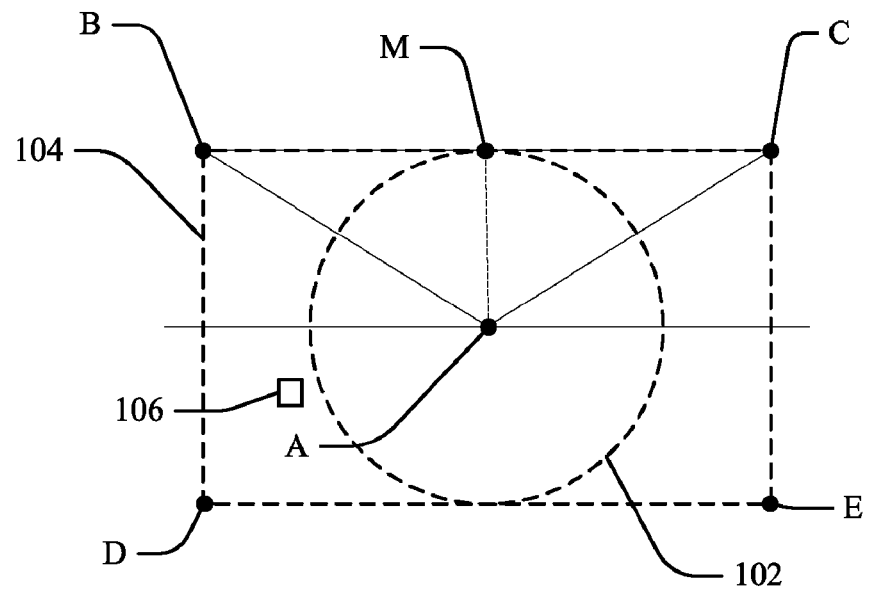
FIG. 2D is another block diagram illustration of the site of FIG. 2A wherein another embodiment of the method forms a triangle from three points A, B and C provided in a Request for Notification and determines a midpoint of the triangle for determining whether the triangle is an isosceles triangle.

In FIG. 2D, there is illustrated an alternate method of determining whether the triangle formed by points A, B and C is an isosceles triangle. The method determines the coordinates $M_x$, $M_y$ of a midpoint M of the triangle where $M_x=x_2+x_3/2$ and $M_y=y_2+y_3/2$. The perpendicular slope p(m) of the line BC is determined where $p(m)=x_2-x_3/y_2-y_3$. This is inverse of the slope $m=y_2-y_3/x_2-x_3$. The line having the slope p(m) is then defined in $y=mx+b$ form. In this case, $y=p(m)x+b$. The midpoint coordinates $M_x$, $M_y$ are substituted in the equation to solve for b. If point A is on this line, then the triangle formed by points A, B and C is an isosceles triangle.

If the triangle formed by points A, B and C is determined to be an isosceles triangle, the remainder of the rectangular geo-boundary 104 may be determined by mirroring the triangle across a line parallel to line BC and passing through point A (See FIG. 2B). To accomplish this, the slope of line BC is determined using the slope equation $m=y_2-y_3$, $x_2-x_3$. Once the slope m is determined, a new line is formed with the line equation $y=mx+b$ using the coordinates $X_1$, $Y_1$ from point A to solve for b. The new line provides a line points B and C may be reflected over. As was previously described in FIG. 2C, the points on the new line corresponding to reflected points B and C are new points D and E. With the points D and E known, the computer can form the new rectangular geo-boundary 104 (see FIG. 2C).

In another embodiment of the invention, the Request for Notification may include the additional points D and E for forming the rectangular geo-boundary 104. In this case, it is not necessary to determine whether the points A, B and C form an isosceles triangle. After verifying that points B, C, D and E form a rectangle, the Geo-boundary Application 211 may directly proceed in forming the rectangular geo-boundary 104 with the known four corners of the rectangle.

Figure 2E:
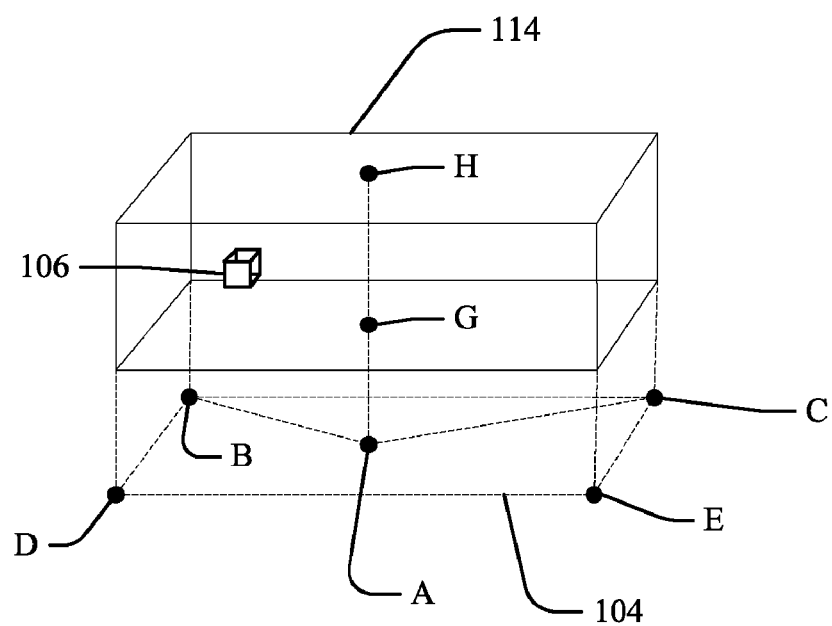
FIG. 2E is a block diagram illustration of a site using the method for creating a three-dimensional geo-boundary with a rectangular base and having a beginning and ending altitude.

Referring now to FIG. 2E, a three-dimensional geo-boundary 114 having a rectangular base is illustrated. Such a three-dimensional geo-boundary 114 is useful in applications where it is desired to locate an object 106 in an area between a desired beginning and ending height. The altitude of the geo-boundary 114 would have a start altitude and an end altitude so two geo-boundaries may have the same base but address different slices of the area above the base. For example, this may address certain floors of a building where it is desired to locate the object 106. Alternately, this may address an object 106 such as an airplane landing at an airport or passing through the airspace over the airport.

If after determining whether the Request for Notification includes the additional coordinates B and C and the triangular boundary formed by points A, B and C form an isosceles triangle, the request may be queried to determine whether altitude information was included in the request. For example, the request may include altitude information such as the height of a point G where the geo-boundary 114 is to begin and the height of a point H where the geo-boundary 114 is to end. If the request includes the altitude information, the geo-boundary 114 is formed by forming the rectangular base in the area as described in FIGS. 2A-2D and including an area that begins at the height of point G and ends at the height of point H.

Figure 3:
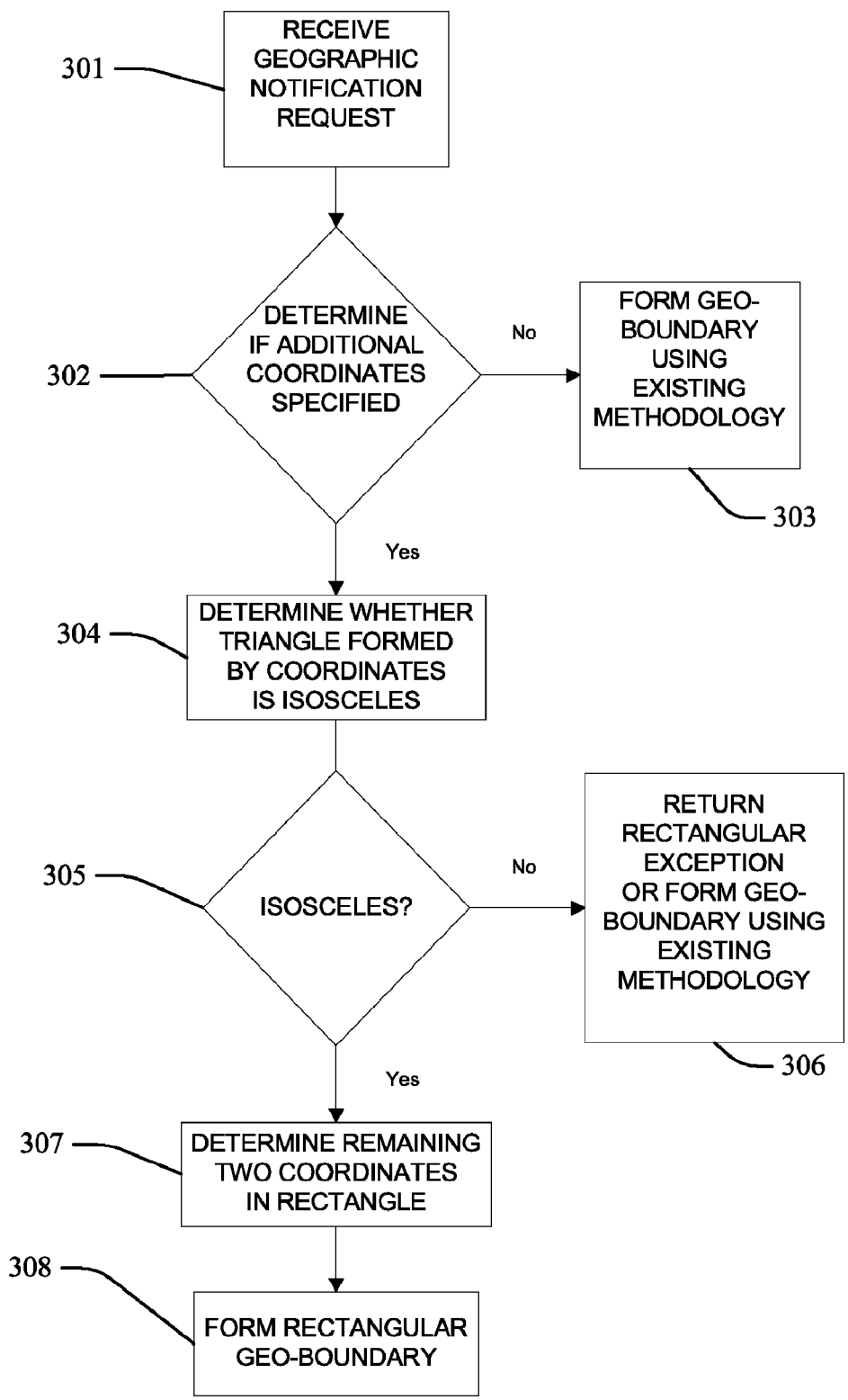
FIG. 3 is a flow diagram illustrating a method for creating a two-dimensional rectangular geo-boundary.

Referring now to FIG. 3, shown is a flow diagram illustrating an embodiment of a method or process of creating a two-dimensional geo-boundary. The method may use the embodiment of the system for creating geo-boundaries shown in FIGS. 2A-2D. In 301, a service provider 210 receives a Geographic Notification Request from a subscriber 220. In 302, the service provider 210 queries the Geographic Notification Request to determine whether the request includes coordinates for a single geographic point A and a radius R, or coordinates for a geographic point A and the coordinates for two additional geographic points B and C. If the service provider 210 determines that the Geographic Notification Request does not include coordinates for two additional geographic points B and C, then at 303 the service provider 210 defines a circular geo-boundary using point A as the center and having a radius R using known methodologies.

If the service provider 210 determines that the Geographic Notification Request includes coordinates for two additional geographic points B and C, at 304 it is determined whether a triangular boundary defined by points A, B and C define an isosceles triangle. The two additional points A and B may be two of the corners of a rectangular geo-boundary the subscriber 220 desires the service provider 210 to form. If the triangular boundary defined by points A, B and C is determined not to be an isosceles triangle, at 305 the flow passes to 306. In 306, a rectangular exception is retuned and the circular geo-boundary is defined using point A as the center and having a radius R using known methodologies.

If the triangular boundary defined by points A, B and C is determined to be an isosceles triangle, the flow passes at 305 to 307 where the coordinates of geographic points D and E are determined. Points D and E are the two remaining points defining the corners of a rectangular geo-boundary 104. With the two remaining points D and E known, at 308 the rectangular geo-boundary 104 may be formed.

Figure 4:
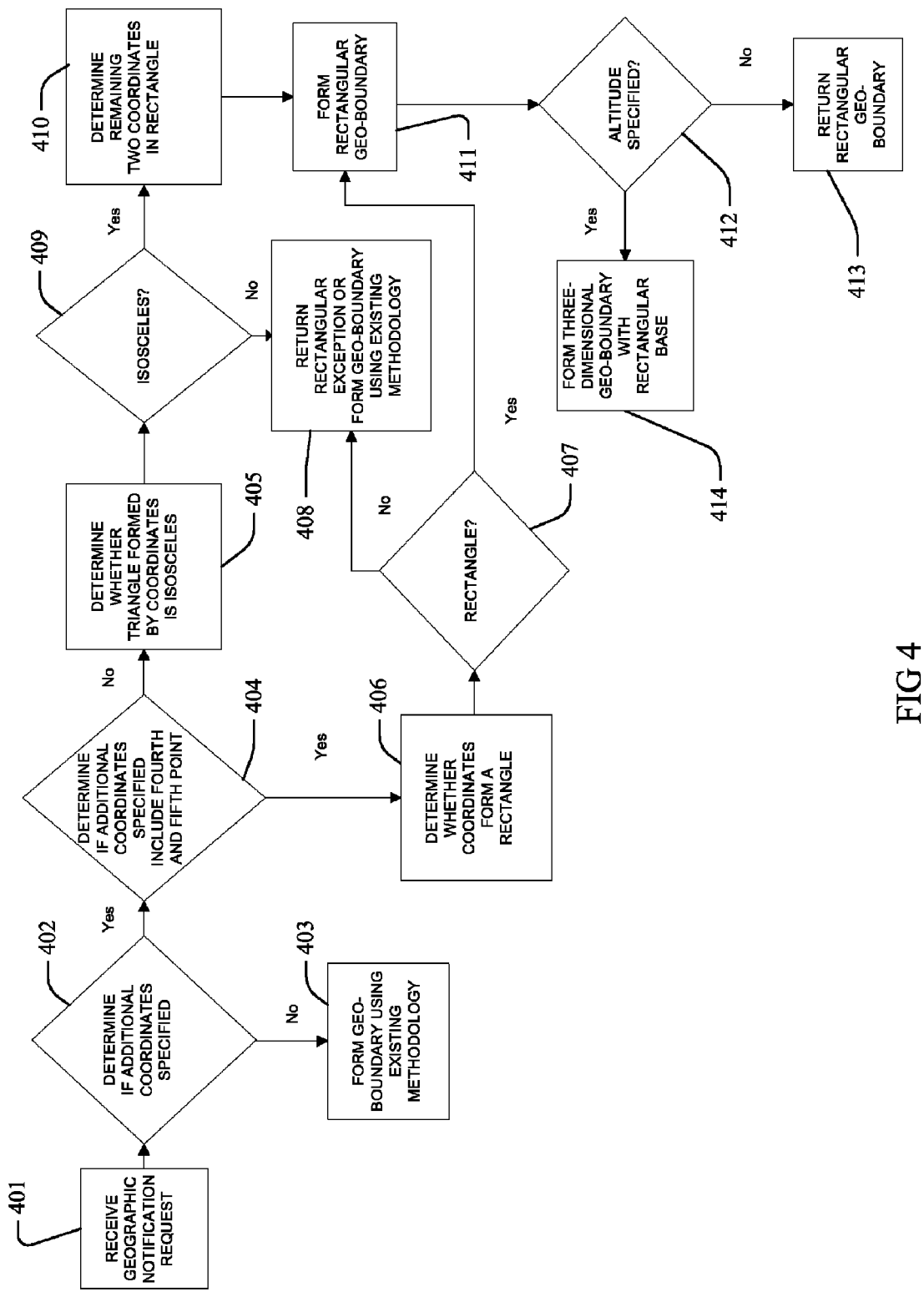
FIG. 4 is a flow diagram illustrating a method for creating a two-dimensional rectangular geo-boundary or a three-dimensional geo-boundary having a rectangular base and having a beginning altitude and ending altitude.

Referring now to FIG. 4, shown is a flow diagram of a method or process of creating a two or three-dimensional geo-boundary. The method may use the embodiment of the system for creating geo-boundaries shown in FIGS. 2A-2E. The method or process proceeds similar to the embodiment of the method or process shown in FIG. 3.

In 401, a service provider 210 receives a Geographic Notification Request from a subscriber 220. In 402, the service provider 210 queries the Geographic Notification Request to determine whether the request includes coordinates for a single geographic point A and a radius R, or coordinates for a geographic point A and coordinates for at least two additional geographic points such as points B and C. If the service provider 210 determines that the Geographic Notification Request does not include coordinates for the two additional geographic points B and C, then at 403 the service provider 210 defines a circular geo-boundary using point A as the center and having a radius R using known methodologies.

If the service provider 210 determines at 402 that the Geographic Notification Request includes at least two additional coordinates such as points B and C, at 404 it is determined whether the additional coordinates include coordinates for two other fourth and fifth points such as points D and E. If it is determined that the request includes coordinates for the two other fourth and fifth points such as points D and E, at 406 it is determined whether the coordinates of the other additional geographic points such as points B, C, D and E define a rectangle. If the points B, C, D and E form a rectangle, at 407 the flow passes to 411 where a rectangular geo-boundary is formed.

If it is determined that the coordinates of the other additional geographic points B, C, D and E do not define a rectangle, at 407 the flow passes to 408 where a rectangular exception is returned and a circular geo-boundary is defined using point A as the center and having the radius R using known methodologies.

If it is determined that the request does specify coordinates for two other points such as points D and E, the flow passes at 404 to 405 where it is determined whether a triangular boundary defined by points A, B and C define an isosceles triangle. If the triangular boundary defined by points A, B and C is determined not to be an isosceles triangle, at 409 the flow passes to 408 where a rectangular exception is retuned and a circular geo-boundary is defined using point A as the center and having a radius R using known methodologies.

If the triangular boundary defined by points A, B and C is determined to be an isosceles triangle, the flow passes at 409 to 410 where the coordinates of the geographic points D and E are determined. Points D and E are the two remaining points defining the corners of a rectangular geo-boundary. With the two remaining points D and E known, at 411 the rectangular geo-boundary is formed and the flow passes to 412.

In 412, the request is queried to determine whether the altitude of the geo-boundary is specified. The request may include the altitude where the geo-boundary is to beginning and the altitude where the geo-boundary is to end. If the request specifies the beginning and ending altitudes of the geo-boundary desired to be formed, at 414 a geo-boundary is formed in the area beginning at the beginning altitude and ending at the ending altitude. If the request does not specify the beginning and ending altitudes of the geo-boundary, at 413 rectangular geo-boundary formed in 411 is returned.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. Thus, embodiments of the present invention comprise methods, apparatus (e.g. systems, devices, etc.) and computer program products. For example, it will be understood that each block of the flowchart illustrations and/or block diagrams of the figures, including FIGS. 3-4 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIGS. 2A-2D and 3-5, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
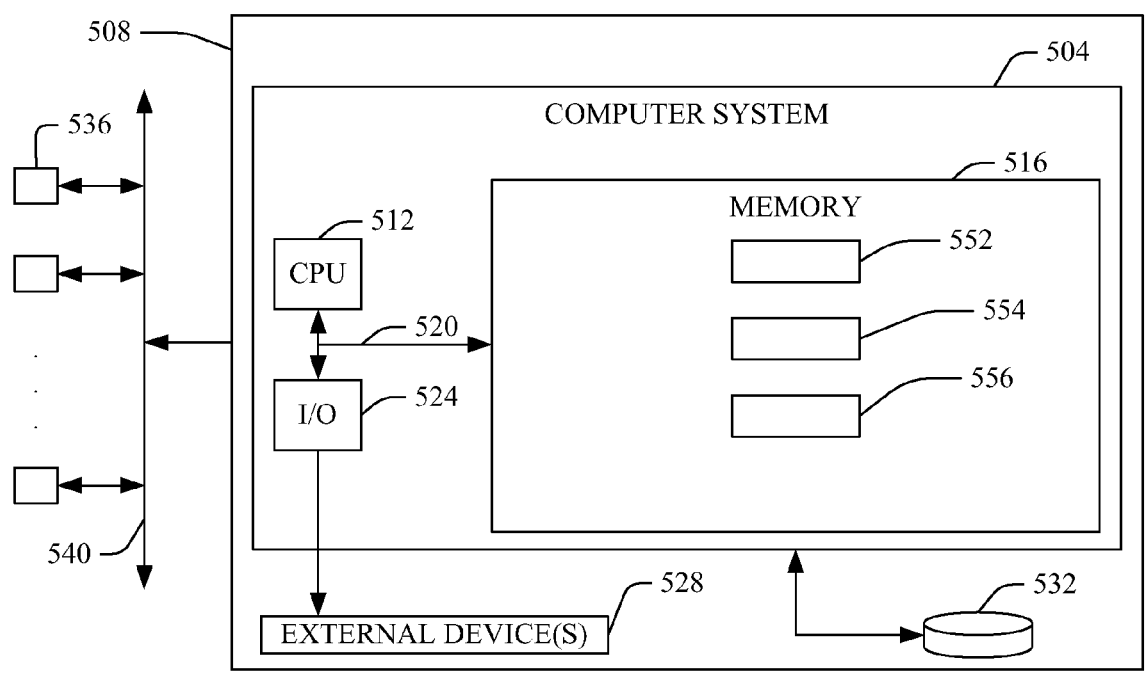
FIG. 5 is a block diagram illustrating a computerized device implementation configured to create a two or three-dimensional geo-boundary.

Referring now to FIG. 5, an exemplary computerized implementation includes a computer system 504 deployed within a computer infrastructure 508 such as a computer or a programmable device such as a personal digital assistant (PDA) or cellular phone. This is intended to demonstrate, among other things, that the present invention could be implemented within a network environment 540 (e.g., the Internet, a wide area network (WAN), a local area network (LAN), a virtual private network (VPN), etc.) in communication with one or more additional computers 536, or on a stand-alone computer infrastructure 508. In the case of the former, communication throughout the network 540 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 504 includes a central processing unit (CPU) 512, a memory 516, a bus 520, and input/output (I/O) interfaces 524. Further, the computer system 504 is shown in communication with external I/O devices/resources 528 and storage system 532. In general, the processing unit 512 executes computer program code, such as the code to implement various components of the process and system for creating geo-boundaries using rectangular fencing as illustrated in FIGS. 2A-2E, 3 and 4 and described above, for example including Geo-boundary Application 211, the Monitoring and Location Application 212, and the Notification Application 213 components discussed above, which are stored in memory 516 and/or storage system 532. It is to be appreciated that two or more, including all, of these components may be implemented as a single component.

While executing computer program code, the processing unit 512 can read and/or write data to/from the memory 516, the storage system 532, and/or the I/O interfaces 524. The bus 520 provides a communication link between each of the components in computer system 504. The external devices 528 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 508 is only illustrative of various types of computer infrastructures for implementing the invention. For example, in one embodiment, computer infrastructure 508 comprises two or more computing devices (e.g., a server cluster) that communicate over a network to perform the various process steps of the invention. Moreover, computer system 504 is only representative of various possible computer systems that can include numerous combinations of hardware.

To this extent, in other embodiments, the computer system 504 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 512 may comprise a single processing unit, or be distributed across one or more processing units in one or more locations, e.g., on a client and server. Similarly, the memory 516 and/or the storage system 532 can comprise any combination of various types of data storage and/or transmission media that reside at one or more physical locations.

Further, I/O interfaces 524 can comprise any system for exchanging information with one or more of the external device 528. Still further, it is understood that one or more additional components (e.g., system software, math co-processing unit, etc.) not shown in FIG. 5 can be included in computer system 504. However, if computer system 504 comprises a handheld device or the like, it is understood that one or more of the external devices 528 (e.g., a display) and/or the storage system 532 could be contained within computer system 504, not externally as shown.

The storage system 532 can be any type of system (e.g., a database) capable of providing storage for information under the present invention. To this extent, the storage system 532 could include one or more storage devices, such as a magnetic disk drive or an optical disk drive. In another embodiment, the storage system 532 includes data distributed across, for example, a local area network (LAN), wide area network (WAN) or a storage area network (SAN) (not shown). In addition, although not shown, additional components, such as cache memory, communication systems, system software, etc., may be incorporated into computer system 504.

Still yet, computer infrastructure 508 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 508 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 508, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 504, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for establishing a geographic boundary for monitoring an object within the geographic boundary, comprising:
in response to a request to form a geographic boundary for monitoring a presence of an object within the geographic boundary, determining via a central processing unit whether the request includes parameters associated with the geographic boundary to be formed including a first set of geographic location coordinates and:
a radius; or
a second set of geographic location coordinates and a third set of geographic location coordinates;
if determined that the request includes the radius and does not include the second and the third set of coordinates, forming a circular geographic boundary on the radius from the first set of geographic location coordinates as a center;
if determined that the request includes the second set of coordinates and the third set of coordinates, determining via the central processing unit if the first, the second and the third sets of coordinates form an isosceles triangle;
if determined that the first, the second and the third sets of coordinates form an isosceles triangle, determining via the central processing unit fourth and fifth sets of coordinates from the formed isosceles triangle and forming a rectangular geographic boundary from the second, the third, the fourth and the fifth sets of coordinates, wherein the second and the third sets of coordinates form a hypotenuse of the formed isosceles triangle; and
if determined that the first, the second and the third set of coordinates do not form an isosceles triangle, determining a rectangular exception and forming a rectangular exception circular geographic boundary on the radius from the first set of geographic location coordinates as the center; and
wherein the formed one of the circular geographic boundary, the rectangular geographic boundary and the rectangular exception circular geographic boundary is configured to be monitored to determine whether the presence of the object is inside or outside of the formed one geographic boundary.

2. The method of claim 1, wherein the step of determining the fourth and the fifth sets of coordinates further comprises:
determining a slope of the hypotenuse; and
mirroring the formed isosceles triangle across a line parallel to the hypotenuse and passing through a point defined by the first set of coordinates to define the fourth set of coordinates as reflected from the second set of coordinates and the fifth set of coordinates as reflected from the third set of coordinates.

3. The method of claim 2, further comprising:
determining if the request specifies beginning and ending altitudes where the geographic boundary is to begin and end; and
if the request specifies the beginning and the ending altitudes, forming the formed one of the circular geographic boundary, the rectangular geographic boundary and the rectangular exception circular geographic boundary as having a footprint of the formed one of the circular geographic boundary, the rectangular geographic boundary and the rectangular exception circular boundary extending from the beginning altitude to the ending altitude; and
wherein the formed one of the circular geographic boundary, the rectangular geographic boundary and the rectangular exception circular geographic boundary is configured to be monitored to determine whether the presence of the object is inside or outside of the formed one geographic boundary and between the beginning and the ending altitudes.

4. The method of claim 3, further comprising:
determining whether the request includes parameters associated with the geographic boundary to be formed including the first set of geographic location coordinates and four additional sets of geographic location coordinates;
if determined that the request includes the first set of geographic location coordinates and the four additional sets of geographic location coordinates, determining if the four additional sets of geographic location coordinates define a rectangle;
if determined that the four additional sets of geographic location coordinates define a rectangle, forming the rectangular geographic boundary from the four additional sets of geographic location coordinates; and
if determined that the four additional sets of geographic location coordinates do not define a rectangle, determining the rectangular exception and forming the rectangular exception circular geographic boundary on the radius from the first set of geographic location coordinates as the center.

5. A method for providing a service for establishing a geographic boundary for monitoring an object within the geographic boundary, comprising:
providing a computer system that:
in response to a request to form a geographic boundary for monitoring a presence of an object within the geographic boundary, determines whether the request includes parameters associated with the geographic boundary to be formed including a first set of geographic location coordinates and:
a radius; or
a second set of geographic location coordinates and a third set of geographic location coordinates;
if determined that the request includes the radius and does not include the second and the third set of coordinates, forms a circular geographic boundary on the radius from the first set of geographic location coordinates;

if determined that the request includes the second set of coordinates and the third set of coordinates, determines if the first, the second and the third sets of coordinates form an isosceles triangle;

if determined that the first, the second and the third sets of coordinates form an isosceles triangle, determines fourth and fifth sets of coordinates from the formed isosceles triangle and forms a rectangular geographic boundary from the second, the third, the fourth and the fifth sets of coordinates, wherein the second and the third sets of coordinates form a hypotenuse of the formed isosceles triangle; and if determined that the first, the second and the third sets of coordinates do not form an isosceles triangle, determines a rectangular exception and forms a rectangular exception circular geographic boundary on the radius from the first set of geographic location coordinates as a center; and wherein the formed one of the circular geographic boundary, the rectangular geographic boundary and the rectangular exception circular geographic boundary is configured to be monitored to determine whether the presence of the object is inside or outside of the formed one geographic boundary.

6. The method of claim 5, wherein the computer system determines the fourth and the fifth sets of coordinates by:
   determining a slope of the hypotenuse; and
   mirroring the formed isosceles triangle across a line parallel to the hypotenuse and passing through a point defined by the first set of coordinates to define the fourth set of coordinates as reflected from the second set of coordinates and the fifth set of coordinates as reflected from the third set of coordinates.

7. The method of claim 6, wherein the computer system further:
   determines if the request specifies beginning and ending altitudes where the geographic boundary is to begin and end; and
   if determined that the request specifies the beginning and the ending altitudes, forms the formed one of the circular geographic boundary, the rectangular geographic boundary and the rectangular exception circular geographic boundary as having a footprint of the formed one of the circular geographic boundary, the rectangular geographic boundary and the rectangular exception circular boundary extending from the beginning altitude to the ending altitude; and
   wherein the formed one of the circular geographic boundary, the rectangular geographic boundary and the rectangular exception circular geographic boundary is configured to be monitored to determine whether the presence of the object is inside or outside of the formed one geographic boundary and between the beginning and the ending altitudes.

8. The method of claim 7, wherein the computer system further:
   determines whether the request includes parameters associated with the geographic boundary to be formed including the first set of geographic location coordinates and four additional sets of geographic location coordinates;
   if determined that the request includes the first set of geographic location coordinates and the four additional sets of geographic location coordinates, determines if the four additional sets of geographic location coordinates define a rectangle;
   if determined that the four additional sets of geographic location coordinates define a rectangle, forms the rectangular geographic boundary from the four additional sets of geographic location coordinates; and
   if determined that the four additional sets of geographic location coordinates do not define a rectangle, determines the rectangular exception and forms the rectangular exception circular geographic boundary on the radius from the first set of geographic location coordinates as the center.

9. A computer readable storage device having computer program code stored thereon, the computer program code comprising instructions that, when executed by a processing unit, cause the processing unit to:
   in response to a request to form a geographic boundary for monitoring a presence of an object within the geographic boundary, determine whether the request includes parameters associated with the geographic boundary to be formed including a first set of geographic location coordinates and:
   a radius; or
   a second set of geographic location coordinates and a third set of geographic location coordinates;
   if determined that the request includes the radius and does not include the second and the third set of coordinates, form a circular geographic boundary on the radius from the first set of geographic location coordinates;
   if determined that the request includes the second set of coordinates and the third set of coordinates, determine if the first, the second and the third sets of coordinates form an isosceles triangle;
   if determined that the first, the second and the third sets of coordinates form an isosceles triangle, determine fourth and fifth sets of coordinates from the formed isosceles triangle and form a rectangular geographic boundary from the second, the third, the fourth and the fifth sets of coordinates, wherein the second and the third sets of coordinates form a hypotenuse of the formed isosceles triangle; and
   if determined that the first, the second and the third sets of coordinates do not form an isosceles triangle, determine a rectangular exception and form a rectangular exception circular geographic boundary on the radius from the first set of geographic location coordinates as a center; and
   wherein the formed one of the circular geographic boundary, the rectangular geographic boundary and the rectangular exception circular geographic boundary is configured to be monitored to determine whether the presence of the object is inside or outside of the formed one geographic boundary.

10. The computer readable storage device of claim 9, wherein the computer program code instructions, when executed by the processing unit, further cause the processing unit to determine the fourth and the fifth sets of coordinates by:
    determining a slope of the hypotenuse; and
    mirroring the formed isosceles triangle across a line parallel to the hypotenuse and passing through a point defined by the first set of coordinates to define the fourth set of coordinates as reflected from the second set of coordinates and the fifth set of coordinates as reflected from the third set of coordinates.

11. The computer readable storage device of claim 10, wherein the computer program code instructions, when executed by the processing unit, further cause the processing unit to:

determine if the request specifies beginning and ending altitudes where the geographic boundary is to begin and end; and if determined that the request specifies the beginning and the ending altitudes, form the formed one of the circular geographic boundary, the rectangular geographic boundary and the rectangular exception circular geographic boundary as having a footprint of the formed one of the circular geographic boundary, the rectangular geographic boundary and the rectangular exception circular boundary extending from the beginning altitude to the ending altitude; and wherein the formed one of the circular geographic boundary, the rectangular geographic boundary and the rectangular exception circular geographic boundary is configured to be monitored to determine whether the presence of the object is inside or outside of the formed one geographic boundary and between the beginning and the ending altitudes.

12. The computer readable storage device of claim 11, wherein the computer program code instructions, when executed by the processing unit, further cause the processing unit to:

determine whether the request includes parameters associated with the geographic boundary to be formed including the first set of geographic location coordinates and four additional sets of geographic location coordinates;

if determined that the request includes the first set of geographic location coordinates and the four additional sets of geographic location coordinates, determine if the four additional sets of geographic location coordinates define a rectangle;

if determined that the four additional sets of geographic location coordinates define a rectangle, form the rectangular geographic boundary from the four additional sets of geographic location coordinates; and if determined that the four additional sets of geographic location coordinates do not define a rectangle, determine the rectangular exception and form the rectangular exception circular geographic boundary on the radius from the first set of geographic location coordinates as the center.

13. A programmable device, comprising:

a processing unit;

a computer readable memory in communication with the processing unit; and a computer readable storage device in communication with the processing unit and the memory and comprising program code instructions stored thereon for execution by the processing unit via the computer readable memory to:

in response to a request to form a geographic boundary for monitoring a presence of an object within the geographic boundary, determine whether the request includes parameters associated with the geographic boundary to be formed including a first set of geographic location coordinates and:

a radius; or a second set of geographic location coordinates and a third set of geographic location coordinates;

if determined that the request includes the radius and does not include the second and the third sets of coordinates, form a circular geographic boundary on the radius from the first set of geographic location coordinates;

if determined that the request includes the second set of coordinates and the third set of coordinates, determine if the first, the second and the third sets of coordinates form an isosceles triangle;

if determined that the first, the second and the third sets of coordinates form an isosceles triangle, determine fourth and fifth sets of coordinates from the formed isosceles triangle and form a rectangular geographic boundary from the second, the third, the fourth and the fifth sets of coordinates, wherein the second and the third sets of coordinates form a hypotenuse of the formed isosceles triangle; and if determined that the first, the second and the third sets of coordinates do not form an isosceles triangle, determine a rectangular exception and form a rectangular exception circular geographic boundary on the radius from the first set of geographic location coordinates as a center; and wherein the formed one of the circular geographic boundary, the rectangular geographic boundary and the rectangular exception circular geographic boundary is configured to be monitored to determine whether the presence of the object is inside or outside of the formed one geographic boundary.

14. The programmable device of claim 13, wherein the program code instructions, when executed by the processing unit, further cause the processing unit to determine the fourth and the fifth sets of coordinates by:

determining a slope of the hypotenuse; and mirroring the formed isosceles triangle across a line parallel to the hypotenuse and passing through a point defined by the first set of coordinates to define the fourth set of coordinates as reflected from the second set of coordinates and the fifth set of coordinates as reflected from the third set of coordinates.

15. The programmable device of claim 14, wherein the program code instructions, when executed by the processing unit, further cause the processing unit to:

determine if the request specifies beginning and ending altitudes where the geographic boundary is to begin and end; and if determined that the request specifies the beginning and the ending altitudes, form the formed one of the circular geographic boundary, the rectangular geographic boundary and the rectangular exception circular geographic boundary as having a footprint of the formed one of the circular geographic boundary, the rectangular geographic boundary and the rectangular exception circular boundary extending from the beginning altitude to the ending altitude; and wherein the formed one of the circular geographic boundary, the rectangular geographic boundary and the rectangular exception circular geographic boundary is configured to be monitored to determine whether the presence of the object is inside or outside of the formed one geographic boundary and between the beginning and the ending altitudes.

16. The programmable device of claim 15, wherein the program code instructions, when executed by the processing unit, further cause the processing unit to:

determine whether the request includes parameters associated with the geographic boundary to be formed including the first set of geographic location coordinates and four additional sets of geographic location coordinates;

if determined that the request includes the first set of geographic location coordinates and the four additional sets of geographic location coordinates, determine if the four additional sets of geographic location coordinates define a rectangle;

if determined that the four additional sets of geographic location coordinates define a rectangle, form the rectangular geographic boundary from the four additional sets of geographic location coordinates; and if determined that the four additional sets of geographic location coordinates do not define a rectangle, determine the rectangular exception and form the rectangular exception circular geographic boundary on the radius from the first set of geographic location coordinates as the center.

* * * * *